United States Patent
Chen et al.

(10) Patent No.: US 12,086,476 B2
(45) Date of Patent: Sep. 10, 2024

(54) PRINTING METHOD AND APPARATUS, AND ELECTRONIC DEVICE

(71) Applicant: BEIJING ZITIAO NETWORK TECHNOLOGY CO., LTD., Beijing (CN)

(72) Inventors: Chuping Chen, Beijing (CN); Meihong Song, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/258,725

(22) PCT Filed: Dec. 21, 2021

(86) PCT No.: PCT/CN2021/139928
§ 371 (c)(1),
(2) Date: Jun. 21, 2023

(87) PCT Pub. No.: WO2022/135369
PCT Pub. Date: Jun. 30, 2022

(65) Prior Publication Data
US 2024/0036774 A1    Feb. 1, 2024

(30) Foreign Application Priority Data
Dec. 21, 2020    (CN) .......................... 202011522443.9

(51) Int. Cl.
*G06F 3/12* (2006.01)
(52) U.S. Cl.
CPC .......... *G06F 3/1204* (2013.01); *G06F 3/1222* (2013.01); *G06F 3/1236* (2013.01);
(Continued)

(58) Field of Classification Search
CPC .... G06F 3/1204; G06F 3/1253; G06F 3/1288; G06F 3/1222; G06F 3/1205; G06F 3/126;
(Continued)

(56) References Cited

U.S. PATENT DOCUMENTS

| 8,390,842 B2* | 3/2013 | Shouno ................... G06F 3/126 |
| | | 358/1.14 |
| 2005/0134886 A1* | 6/2005 | Farrell .................. G06F 3/1244 |
| | | 358/1.9 |

(Continued)

FOREIGN PATENT DOCUMENTS

| CN | 1327672 A | 12/2001 |
| CN | 106371779 A | 2/2017 |

(Continued)

OTHER PUBLICATIONS

International Search Report and Written Opinion, International Patent Application No. PCT/CN2021/139928, Mar. 15, 2022, with English translation (13 pages).

(Continued)

*Primary Examiner* — Negussie Worku
(74) *Attorney, Agent, or Firm* — HSML P.C.

(57) ABSTRACT

Provided are a printing method and apparatus, and an electronic device. The method includes: receiving, in an interface where a first application runs, a printing request initiated by a user for a target file displayed in the interface; running, according to the printing request and in the interface where the first application runs, a preset printing application embedded in the first application; and transmitting the target file to a cloud printing server by using the preset printing application, and instructing the cloud printing server to send the target file to a printing device upon receiving an acquisition request from the printing device, to cause the printing device to print the target file.

10 Claims, 3 Drawing Sheets

(52) U.S. Cl.
CPC .......... *G06F 3/1238* (2013.01); *G06F 3/1253* (2013.01); *G06F 3/126* (2013.01); *G06F 3/1288* (2013.01)

(58) Field of Classification Search
CPC ...... G06F 3/1292; G06F 16/10; G06F 16/986; G06F 3/1208; G06F 3/127; G06F 3/1286; G06F 9/45512; G06F 3/12; G06F 3/1224; G06F 3/1226; G06F 3/1231; G06F 3/1267; G06F 3/1285; G06F 3/1289; G06F 40/35; G06F 15/16; G06F 16/172; G06F 16/2282; G06F 16/2433; G06F 16/2455; G06F 16/258; G06F 21/602; G06F 3/0412; G06F 3/1238; G06F 3/1247; G06F 3/1287; G06F 40/186; G06F 16/24552; G06F 16/248; G06F 16/284; G06F 21/6245; G06F 3/1206; G06F 3/1211; G06F 3/122; G06F 3/1228; G06F 3/1236; G06F 3/1244; G06F 3/1248; G06F 3/125; G06F 3/1256; G06F 3/1262; G06F 3/1272; G06K 7/1417; G06K 19/06037; G06Q 20/14; G06Q 20/18; G06Q 30/0241; G06Q 50/10; G06Q 50/30; G06Q 50/32; H04L 9/3226; H04L 51/08; H04N 1/00244; H04N 1/00413; H04N 1/00474; H04N 2201/0094
USPC ................................................. 358/400, 1.15
See application file for complete search history.

(56) References Cited

U.S. PATENT DOCUMENTS

| 2006/0132837 | A1 | 6/2006 | Barth et al. |
| 2013/0025186 | A1* | 1/2013 | Scheubeck .............. A01M 3/02 43/137 |
| 2013/0191514 | A1* | 7/2013 | Tsuda ..................... G06F 3/122 709/219 |
| 2015/0092233 | A1* | 4/2015 | Park ................... H04N 1/00244 358/1.15 |
| 2020/0042260 | A1* | 2/2020 | Kanamoto ............ G06F 3/1253 |

FOREIGN PATENT DOCUMENTS

| CN | 110275682 A | 9/2019 |
| CN | 112650456 A | 4/2021 |

OTHER PUBLICATIONS

Office Action issued in Chinese Patent Application No. 202011522443. 9, Jan. 31, 2024 (9 pages).

* cited by examiner

PRINTING METHOD AND APPARATUS, AND ELECTRONIC DEVICE

CROSS REFERENCE OF RELATED APPLICATION

The present application is the national phase application of PCT International Patent Application No. PCT/CN2021/139928, filed on Dec. 21, 2021 which claims priority to Chinese Patent Application No. 202011522443.9, titled "PRINTING METHOD AND APPARATUS, AND ELECTRONIC DEVICE", filed on Dec. 21, 2020 with the China National Intellectual Property Administration, both of which are incorporated herein by reference in their entireties.

FIELD

The present disclosure relates to the field of internet technology, in particular to a printing method, a printing apparatus, and an electronic device.

BACKGROUND

Cloud printing technology is based on the Internet, integrates printing device resources, builds a shared printing platform, and provides standardized printing services to ordinary users in society anytime and anywhere.

Based on the cloud printing technology, a user may upload a target file from a terminal device and initiates a printing request, and can print the target file through a target printing device.

SUMMARY

This summary is provided to introduce concepts in a simplified form. These concepts will be described in detail in the following detailed description. This summary is neither intended to identify key features or essential features of the claimed technical solution, nor intended to limit the scope of the claimed technical solution.

The embodiments of the present disclosure provide a printing method, a printing apparatus, and an electronic device.

In a first aspect, an embodiment of the present disclosure provides a printing method. The method comprises: receiving, in an interface where a first application runs, a printing request initiated by a user for a target file displayed in the interface; running, according to the printing request and in the interface where the first application runs, a preset printing application embedded in the first application; and transmitting the target file to a cloud printing server by using the preset printing application, and instructing the cloud printing server to send the target file to a printing device upon receiving an acquisition request from the printing device, to cause the printing device to print the target file.

In a second aspect, an embodiment of the present disclosure provides a printing apparatus. The apparatus includes: a receiving module configured to receive, in an interface where a first application runs, a printing request initiated by a user for a target file displayed in the interface; a running module configured to run, according to the printing request and in the interface where the first application runs, a preset printing application embedded in the first application; and a printing module configured to transmit the target file to a cloud printing server by using the preset printing application, and instruct the cloud printing server to send the target file to a printing device upon receiving an acquisition request from the printing device, to cause the printing device to print the target file.

In a third aspect, an embodiment of the present disclosure provides an electronic device. The electronic device comprises: one or more processors; and a storage device storing one or more programs, and the one or more programs, when executed by the one or more processors, causing the one or more processors to perform the printing method described in the first aspect.

In a fourth aspect, an embodiment of the present disclosure provides a computer-readable medium storing computer programs, the programs, when executed by a processor, causing the processor to perform the printing method described in the first aspect.

According to the printing method, the printing apparatus and the electronic device provided in the embodiments of the present disclosure, firstly, in an interface where a first application runs, a printing request initiated by a user for a target file displayed in the interface is received; then according to the printing request, a preset printing application embedded in the first application is run in the interface where the first application runs; finally, the target file is transmitted to a cloud printing server by using the preset printing application, and the cloud printing server is instructed to send the target file to a printing device upon receiving an acquisition request from the printing device, to cause the printing device to print the target file. In this way, the user can initiate printing without downloading the target file to the user terminal, thereby simplifying the printing process. In addition, the target file is directly acquired from the cloud printing server through the printing device, thereby reducing the risk of the target file being leaked.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these examples are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments." Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative but not restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

It should be noted that, in the absence of conflict, the embodiments and features in the embodiments in this disclosure may be combined with each other.

Figure 1:
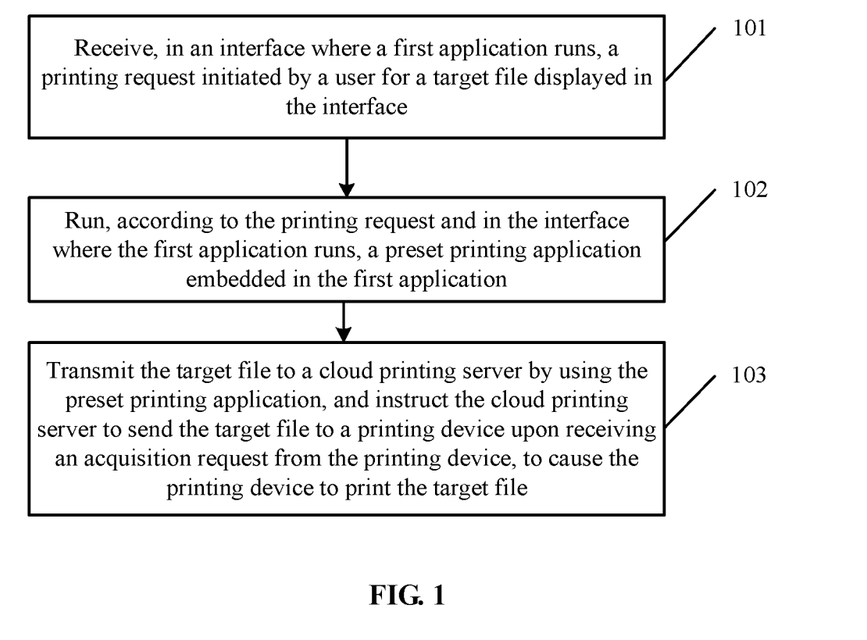
FIG. 1 is a flowchart of a printing method according to an embodiment of the present disclosure.

Reference is made to FIG. 1, which shows a flowchart of a printing method according to an embodiment of the present disclosure. As shown in FIG. 1, the printing method comprises steps 101 to 103 as follows.

Step 101, receive, in an interface where a first application runs, a printing request initiated by a user for a target file displayed in the interface.

The first application mentioned may include, for example, an office application, a chat application, etc. The target file may include an office file or a chat file received in an interface of a display dialogue window corresponding to the office application or the chat application.

After receiving the target file by using the first application, the target file may be stored and displayed in a running interface by using the first application. Here, a user may receive multiple target files, and the first application may display the received multiple target files.

In some application scenarios, the target file received by the user may be transmitted, by using the first application, to a corresponding first server for storage. After the first server receives the target file sent by the first application, the first server may store the received target file and set a corresponding storage time period. For example, the first server may store the received "XXX file" for 2 hours, 3 hours, etc. When the storage time period is met, the "XXX file" may be deleted to release memory space.

In some application scenarios, the user may initiate the printing request for the target file displayed in the interface of the first application. Here, multiple target files may be displayed in the interface, and the user may initiate the printing request by triggering a preset control for instructing to print the target file. For example, a circle representing the preset control may be set at the back of each target file. When the user clicks on the circle, a color and a shape or the like of the circle may be changed to represent a triggering state of the circle. When the user clicks on the circle corresponding to target file A to cause the circle to change its color, it may be considered as receiving the printing request initiated by the user for the target file A.

Step 102, run, according to the printing request and in the interface where the first application runs, a preset printing application embedded in the first application.

The preset printing application may be run when receiving the printing request. Here, the preset printing application may include a printing driver program that establishes a communication connection with the first application. That is, when the first application receives the printing request, it may trigger the running of the preset printing application. For example, a chat application a and a printing application b have established a communication connection in advance. When the chat application a receives a printing request from the user for a chat file A, it may trigger the running of the printing application b. At this point, the corresponding interface of the printing application b may be displayed.

Step 103, transmit the target file to a cloud printing server by using the preset printing application, and instruct the cloud printing server to send the target file to a printing device upon receiving an acquisition request from the printing device, to cause the printing device to print the target file.

The target file may be sent to the preset printing application by using the first application, and the target file is transmitted to the cloud printing server for storage by using the preset printing application. In some application scenarios, the target file is transmitted to the first server by using the first application and is stored by the first server, then a notification message is sent to the preset printing application by using the first application to notify the preset printing application to acquire the corresponding target file from the first server.

After receiving the target file, the preset printing application may transmit the target file to the cloud printing server. After receiving the target file, the cloud printing server may store the target file. Upon receiving an acquisition request from the printing device, the cloud printing server sends the target file to the printing device. Here, the acquisition request may include a specific identifier. For example, the cloud printing server, only when receiving the acquisition request including a specific identifier "abc", sends the target file to the printing device that issued the acquisition request. Here, the specific identifier may be transmitted through the first application.

After receiving the printing request (such as the printing request including the specific identifier) from the first application, the printing device may actively send the acquisition request to the cloud printing server, and may print the target file after acquiring the target file. In this way, the printing device actively acquires the target file from the cloud printing server, the target file can be directly printed without being converted into an online document, thereby reducing the channels for acquiring the target file (for example, when converting the target file into an online document, an address link is assigned to the online document, and the target file can be acquired by accessing the address link), and reducing the risk of the target file being leaked, and improving the security of the printing process.

In related technologies, when receiving the target file, it is generally necessary to download the target file to the terminal device and then upload the target file to the corresponding cloud printing server through the terminal device. Subsequently, the target file may be printed after the cloud printing server is connected with the printing device.

In this embodiment, firstly, in an interface where a first application runs, a printing request initiated by a user for a target file displayed in the interface is received; then according to the printing request, a preset printing application embedded in the first application is run in the interface where the first application runs; finally, the target file is transmitted to a cloud printing server by using the preset printing application, and the cloud printing server is instructed to send the target file to a printing device upon receiving an acquisition request from the printing device, to cause the printing device to print the target file. In this way, the user can initiate printing without downloading the target file to the user terminal, thereby simplifying the printing process. In addition, the target file is directly acquired from the cloud printing server through the printing device, thereby reducing the risk of the target file being leaked. In addition, when initiating the printing request to the cloud printing server, only the target file to be printed is sent to the cloud printing server for printing, the printing process do not involve any other content on the application interface. Other content on the application interface are not leaked, thereby improving security of user information.

In some optional implementations, the transmitting the target file to a cloud printing server by using the preset printing application in step 102 may comprise: detecting a file format of the target file by using the preset printing application to obtain a detection result, and determining whether to transmit the target file to the cloud printing server based on the detection result.

In practice, it is necessary to determine whether the file format of the target file is a printable file format. The file format here may include portable document format (PDF), docx document format (such as Word document), etc.

After receiving the target file, the preset printing application may detect whether the file format of the target file is in a printable file format, and may transmit the target file to the cloud printing server when the detection result shows that the target file has a printable file format. Here, the preset printing application may pre-set the printable file formats for detection. After the target file is received, the file format of the target file may be determined, it is determined whether the file format of the target file exists in the pre-set printable file formats. If the file format of the target file exists in the pre-set printable file formats, the target file is transmitted to the cloud printing server. For example, the file format of target file A is PDF. After the preset printing application receives the target file A, it is determined whether the pre-set printable file formats include a PDF format. If the pre-set printable file formats include a PDF format, it may be considered that the target file A can be printed, and then the target file A is transmitted to the cloud printing server.

In some application scenarios, if it is detected that the file format of the target file is not a printable file format, for example, the file format of the target file is a video file format, an audio file format, etc., the corresponding target file may not be sent to the cloud printing server, and prompting information such as "upload failed" and "the file cannot be printed" may be displayed, to remind the user to convert the target file into a printable file.

By detecting whether the file format of the target file belongs to the preset printable file formats, it is possible to avoid transmitting unprintable files to the cloud printing server, thereby ensuring that all target files on the cloud printing server are printable, reducing the caching requirement of the cloud printing server.

In some optional implementations, before step 102, the method may further comprise step 1: converting the target file that meets a preset file format requirement into an encrypted file by using the preset printing application.

When it is detected that the file format of the target file meets a preset file format requirement by using the preset printing application, the target file may be encrypted to obtain a corresponding encrypted file. In this way, even if the target file is leaked, it difficult to crack the target file, thereby further improving the transmission security of the target file. For example, the preset file format requirement here may include a PDF format, a docx format, etc.

In some application scenarios, the target file may be converted into the corresponding encrypted file through transcoding. For example, the statement "tentatively scheduled for execution on Jun. 20, 2020" may be transcoded to be "ABC1234D56E78FGH". In this way, without corresponding decoding, even if the target file is obtained, the specific content of the target file cannot be known.

After performing step 1, step 102 may include: transmitting the encrypted file to the cloud printing server by using the preset printing application.

That is, the target file may be converted into a corresponding encrypted file by using the preset printing application, and then the encrypted file is transmitted to the cloud printing server. After receiving the encrypted file, the cloud printing server may store the encrypted file. In some application scenarios, the preset printing application may send a corresponding encrypting password together with the encrypted file. After receiving the encrypting password and the encrypted file, the cloud printing server may associate and store the encrypting password and the encrypted file. In this way, the cloud printing server may send the corresponding encrypted file to the printing device that issued the acquisition request when the received acquisition request includes the encrypting password. For example, the target file A is transcoded to an encrypted file A' with a corresponding encrypting password of "123456". Both the encrypted file A' and the encrypting password "123456" are sent to the cloud printing server by using the preset printing application. After receiving the encrypted file A' and the encrypting password "123456", the cloud printing server associate and store the encrypted file A' and the encrypting password "123456". When receiving an acquisition request including "123456" from the printing device, the target file may be sent. The printing device converts the encrypted file into the target file A according to the corresponding decryption password and then print the target file A.

In some optional implementations, the printing method may also include step 2: displaying a printing parameter editing window by using the preset printing application to remind the user to set a printing parameter corresponding to the target file.

After uploading the target file to the cloud printing server by using the preset printing application, the printing parameter editing window may be displayed to the user, so that the user sets the printing parameter according to his own requirement. The printing parameter may include attribute parameters such as the number of printed copies, a size of printing paper, a printing color (black and white or color), and whether to perform double-sided printing. The user may set these attribute parameters through the displayed printing parameter editing window. For example, it may be set to print 5 target files and use A4 paper for double-sided printing. In some application scenarios, a default printing parameter may be set by using the preset printing application, and then the target file may be uploaded to the cloud printing server. When the user initiates a printing operation, the printing parameter editing window may be displayed to the user, so than the user can modify the printing parameter. The default printing parameter here may be the printing parameter used frequently. For example, the preset printing application may be used to set the number of printed copies of the target file to 1, and set A4 paper used frequently as the size of the printing paper. Subsequently, the user only needs to modify part of printing parameters according to his own requirement, thereby simplifying the user operation.

In some optional implementations, the printing method may also include step 3: displaying a printing portal by using the first application, to connect to a target printing device through the printing portal and instruct the target printing device to send the acquisition request to the cloud printing server.

After the target file is successfully transmitted to the cloud printing server, the printing portal may be displayed to the user by using the first application. The user may select the corresponding target printing device based on the printing entry to establish a communication connection with the target printing device. After establishing the communication connection with the target printing device, the target printing device may be instructed to acquire the target file from the cloud printing server.

In practice, after receiving the target file, the cloud printing server may send feedback information about receiving the target file to the first application. The first application may display the print portal after receiving the feedback information.

In some application scenarios, the interface where the first application runs may include a first interface for displaying the dialogue window, and the printing portal may be displayed in the first interface. In other application scenarios, the interface where the first application runs may also include a second interface for receiving the target file forwarded by the user from the dialogue window, and the printing portal may be displayed in the second interface.

In some optional implementations, the target printing device displays encoding information, the printing portal comprises a scanning window for scanning the encoding information, and step 3 may include: scanning the encoding information displayed on the target printing device by using the scanning window displayed by the first application, and sending the scanned encoding information to the cloud printing server, to establish a communication connection between the target printing device and the cloud printing server, and instruct the target printing device to send the acquisition request to the cloud printing server through the communication connection.

In some application scenarios, the target printing device may display the encoding information. The encoding information here may include, for example, QR code information, barcode information, and other information that can essentially carry the identity of the target printing device. In this way, the user can scan the encoding information of the target printing device through the printing portal, and then use the first application to send the scanned encoding information to the cloud printing server.

In other application scenarios, prompt information for guiding the user to scan the code may be displayed by using the first application. For example, before displaying the scanning window, prompt information such as "please scan the encoding information of the printing device through the scanning window" may be displayed to guide the user to perform the scanning operation.

After receiving the encoding information, the cloud printing server may recognize the identity of the target printing device and establish a communication connection with the corresponding target printing device based on the identity information indicated by the encoding information. After the communication connection is successfully established, the target printing device may send an acquisition request for acquiring the target file to the cloud printing server. After the cloud printing server receives the acquisition request, the corresponding target file may be sent to the target printing device. The target printing device then prints the target file. In this way, the communication connection may be established with the cloud printing server by scanning the encoding information of the target printing device, to complete the transmission task of the target file. The operation is simple, convenient, and fast.

Figure 2:
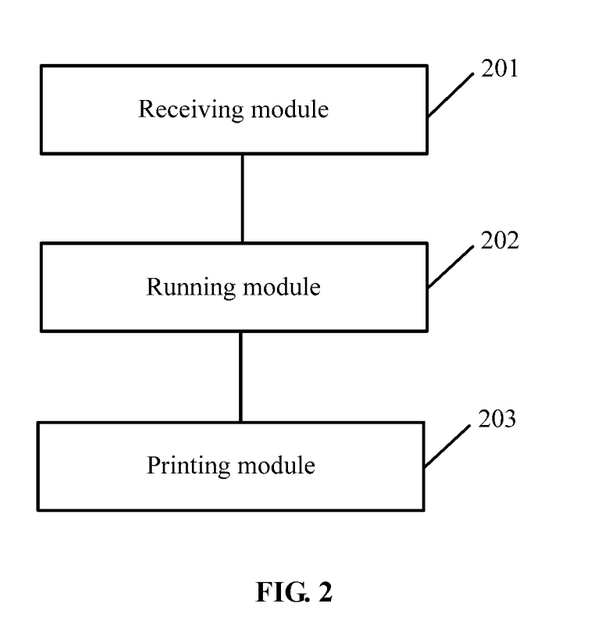
FIG. 2 is a schematic structural diagram of a printing apparatus according to an embodiment of the present disclosure.

Reference is made to FIG. 2, which shows a schematic structural diagram of a printing apparatus according to an embodiment of the present disclosure. As shown in FIG. 2, the printing apparatus includes a receiving module 201, a running module 202 and a printing module 203. The receiving module 201 is configured to receive, in an interface where a first application runs, a printing request initiated by a user for a target file displayed in the interface. The running module 202 is configured to run, according to the printing request and in the interface where the first application runs, a preset printing application embedded in the first application. The printing module 203 is configured to transmit the target file to a cloud printing server by using the preset printing application, and instruct the cloud printing server to send the target file to a printing device upon receiving an acquisition request from the printing device, to cause the printing device to print the target file.

It should be noted that, for the specific processing and technical effects of the receiving module 201, the running module 202, and the printing module 203 of the printing apparatus, one may refer to related illustration of step 101 to 103 in the embodiment described with reference to FIG. 1. Details are not described herein.

In some optional implementations of the embodiment, the printing module 203 is further configured to: detect a file format of the target file by using the preset printing application to obtain a detection result, and determining whether to transmit the target file to the cloud printing server based on the detection result.

In some optional implementations of the embodiment, the printing apparatus further includes an encrypting module configured to: before performing the operation of the printing module 203, convert the target file that meets a preset file format requirement into an encrypted file by using the preset printing application. The printing module 203 is further configured to transmit the encrypted file to the cloud printing server by using the preset printing application.

In some optional implementations of the embodiment, the printing apparatus further includes a first display module configured to display a printing parameter editing window by using the preset printing application to remind the user to set a printing parameter corresponding to the target file.

In some optional implementations of the embodiment, the printing apparatus further includes a second display module configured to display a printing portal by using the first application, to connect to a target printing device through the printing portal and instruct the target printing device to send the acquisition request to the cloud printing server.

In some optional implementations of the embodiment, the target printing device displays encoding information, the printing portal comprises a scanning window for scanning the encoding information; and the second display module is further configured to: scan the encoding information displayed on the target printing device by using the scanning window displayed by the first application, and send the scanned encoding information to the cloud printing server, to establish a communication connection between the target printing device and the cloud printing server, and instruct the target printing device to send the acquisition request to the cloud printing server through the communication connection.

Figure 3:
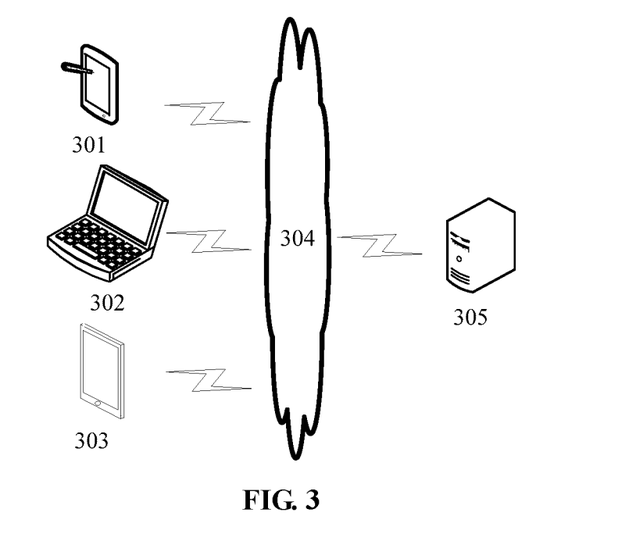
FIG. 3 shows a schematic system architecture to which the printing method according to the embodiment of the present disclosure is applied.

Reference is made to FIG. 3 shows a schematic system architecture to which the printing method according to the embodiment of the present disclosure is applied.

As shown in FIG. 3, the system architecture may include terminal devices 301, 302 and 303, a network 304 and a server 305. The network 304 is configured to provide medium of a communication link between the terminal devices 301, 302, 303 and the server 305. The network 304 may include various types of connections, such as wired, wireless communication links or optical fiber cable. The terminal devices may communicate with the server by using any currently known or future developed network protocol such as HTTP (Hyper Text Transfer Protocol), and may be interconnected with any form or medium of digital data communication (such as communication networks). Examples of communication networks include local area networks ("LANs"), wide area networks ("WANs"), internets (such as the Internet), and end-to-end networks (such as Ad hoc end-to-end networks), as well as any currently known or future developed networks.

The terminal devices 301, 302 and 303 may interact with the server 305 over the network 304, to receive or transmit messages. The terminal devices 301, 302 and 303 may be installed with various clients, such as chat applications, office applications.

The terminal devices 301, 302 and 303 may be implemented by hardware or software. In a case that the terminal devices 301, 302 and 303 are implemented as hardware, the terminal device may be an electronic device including a display screen and supporting web browsing, including but not limited to a smart mobile phone, a tablet computer, an electronic book reader, a moving picture experts group audio layer III (MP3) player, a moving picture experts group audio layer IV (MP4) player, a laptop portable computer and a desktop computer. In a case that the terminal devices 301, 302 and 303 are implemented by software, the terminal device may be installed in the electronic device listed above. The terminal device may be implemented as multiple software or software modules (for example software or software module for providing a distributed service), or may be implemented as a single software or software module. The implementations of the terminal device are not limited herein.

The server 305 may provide various services. For example, the server 305 is configured to receive the target files transmitted from the terminal devices 301, 302 and 303, and store the target files.

It should be noted that, the printing method described in the embodiments of the present disclosure may be performed by the server or the terminal device. Accordingly, the printing apparatus may be arranged in the server or the terminal device.

It should be understood that the numbers of terminal device, network and server in FIG. 3 are only schematic. Any number of terminal device, network and server may be provided according to actual need.

Figure 4:
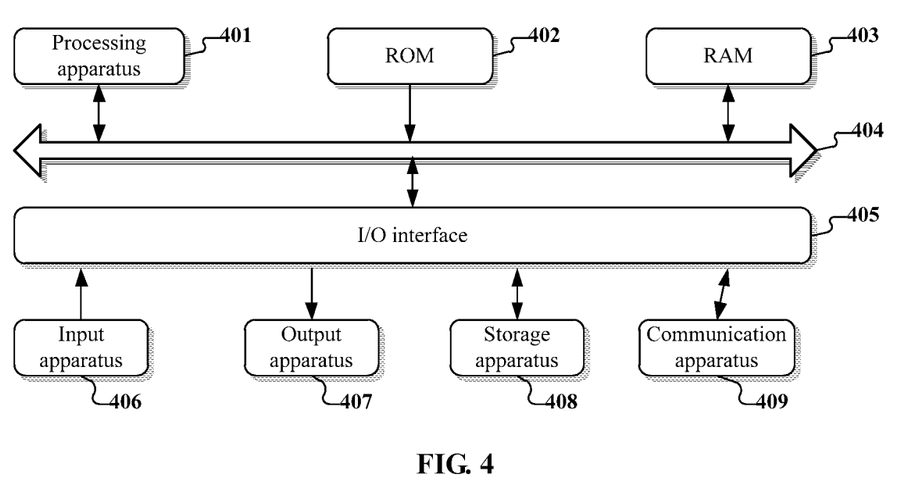
FIG. 4 is a schematic structural diagram of an electronic device according to an embodiment of the present disclosure.

Reference is made to FIG. 4 which shows a schematic structural diagram of an electronic device (for example the terminal device shown in FIG. 3) for implementing the embodiment of the present disclosure. The electronic device shown in FIG. 4 is only schematic, and does not limit the functions and usage of the embodiments of the present disclosure.

As shown in FIG. 4, the electronic device may include a processing apparatus (such as a central processor and a graphic processor) 401. The processing apparatus may perform various appropriate actions and processing by executing programs stored in a read-only memory (ROM) 402 or programs uploaded from a storage apparatus 408 to a random access memory (RAM) 403. Various programs and data required for operations of the electronic device are also stored in the RAM 403. The processing apparatus 401, the ROM 402 and the RAM 403 are connected to each other through the bus 404. An input/output (I/O) interface 405 is also connected to the bus 404.

Generally, the following components are connected to the I/O interface 405: an input apparatus 406 such as a touch screen, a touch panel, a keyboard, a mouse, a camera, a microphone, an accelerometer, and gyroscope; an output apparatus 407 such as a liquid crystal display (LCD), a loudspeaker and a vibrator; a storage apparatus 408 such as a magnetic tape and a hard disk; and a communication apparatus 409. The communication apparatus 409 may allow the electronic device to communicate with other device in a wired or wireless manner to exchange data. Although FIG. 4 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 409, installed from the storage apparatus 408 or installed from the ROM 402. The computer program is executed by the processing apparatus 401 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

The computer readable medium may be included in the electronic device described above, or may exist independently and is not installed in the electronic device.

The computer readable storage medium carries one or more programs. The one or more programs, when being executed by the electronic device, causes the electronic device to perform operations: receiving, in an interface where a first application runs, a printing request initiated by a user for a target file displayed in the interface; running, according to the printing request and in the interface where the first application runs, a preset printing application embedded in the first application; and transmitting the target file to a cloud printing server by using the preset printing application, and instructing the cloud printing server to send the target file to a printing device upon receiving an acquisition request from the printing device, to cause the printing device to print the target file.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the receiving module 201 may be referred to as "a module for receiving, in an interface where a first application runs, a printing request initiated by a user for a target file displayed in the interface".

The functions described above may be partially performed by one or more hardware logic components. For example, the demonstration types of hardware logic components that can be used include: a field programmable gate array (FPGA), an application specific integrated circuit (ASIC), an application specific standard product (ASSP), a system on chip (SOC), a complex programmable logic device (CPLD) and so on.

It the context of the present disclosure, the computer readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. A printing method comprising:
receiving, in an interface where a first application runs, a printing request initiated by a user for a target file displayed in the interface;
running, according to the printing request and in the interface where the first application runs, a preset printing application embedded in the first application;
transmitting the target file to a cloud printing server by using the preset printing application; and
instructing the cloud printing server to send the target file to a printing device upon receiving an acquisition request from the printing device, to cause the printing device to print the target file.

2. The method according to claim 1, wherein the transmitting the target file to a cloud printing server by using the preset printing application comprises:
detecting a file format of the target file by using the preset printing application to obtain a detection result, and determining whether to transmit the target file to the cloud printing server based on the detection result.

3. The method according to claim 1, wherein before transmitting the target file to the cloud printing server by using the preset printing application, the method further comprises:
converting the target file that meets a preset file format requirement into an encrypted file by using the preset printing application; and
the transmitting the target file to a cloud printing server by using the preset printing application comprises:
transmitting the encrypted file to the cloud printing server by using the preset printing application.

4. The method according to claim 1, further comprising:
displaying a printing parameter editing window by using the preset printing application to remind the user to set a printing parameter corresponding to the target file.

5. The method according to claim 1, further comprising:
displaying a printing portal by using the first application, to connect to a target printing device through the printing portal and instruct the target printing device to send the acquisition request to the cloud printing server.

6. The method according to claim 5, wherein
the target printing device displays encoding information,
the printing portal comprises a scanning window for scanning the encoding information; and
the displaying a printing portal by using the first application to connect to a target printing device through the printing portal and instruct the target printing device to send the acquisition request to the cloud printing server comprises:

scanning the encoding information displayed on the target printing device by using the scanning window displayed by the first application, and
sending the scanned encoding information to the cloud printing server to establish a communication connection between the target printing device and the cloud printing server, and
instructing the target printing device to send the acquisition request to the cloud printing server through the communication connection.

7. The method according to claim 1, wherein before receiving the printing request initiated by the user for the target file displayed in the interface, the method further comprises:
displaying a first interface of a dialogue window; or
displaying a second interface for receiving the target file forwarded by the user from the dialogue window.

8. The method according to claim 1, wherein the first application comprises an office application or a chat application.

9. An electronic device, comprising:
at least one processor; and
at least one memory communicatively coupled to the at least one processor and storing instructions that upon execution by the at least one processor cause the device to:
receive, in an interface where a first application runs, a printing request initiated by a user for a target file displayed in the interface;
run, according to the printing request and in the interface where the first application runs, a preset printing application embedded in the first application;
transmit the target file to a cloud printing server by using the preset printing application, and
instruct the cloud printing server to send the target file to a printing device upon receiving an acquisition request from the printing device to cause the printing device to print the target file.

10. A computer readable non-transitory medium bearing computer-readable instructions that upon execution on a computing device cause the computing device at least to:
receive, in an interface where a first application runs, a printing request initiated by a user for a target file displayed in the interface;
run, according to the printing request and in the interface where the first application runs, a preset printing application embedded in the first application; and
transmit the target file to a cloud printing server by using the preset printing application, and instructing the cloud printing server to send the target file to a printing device upon receiving an acquisition request from the printing device, to cause the printing device to print the target file.

* * * * *